2 Sheets—Sheet 1.
E. S. BLAKE.
STEAM VACUUM-PUMP.
No. 191,397. Patented May 29, 1877.
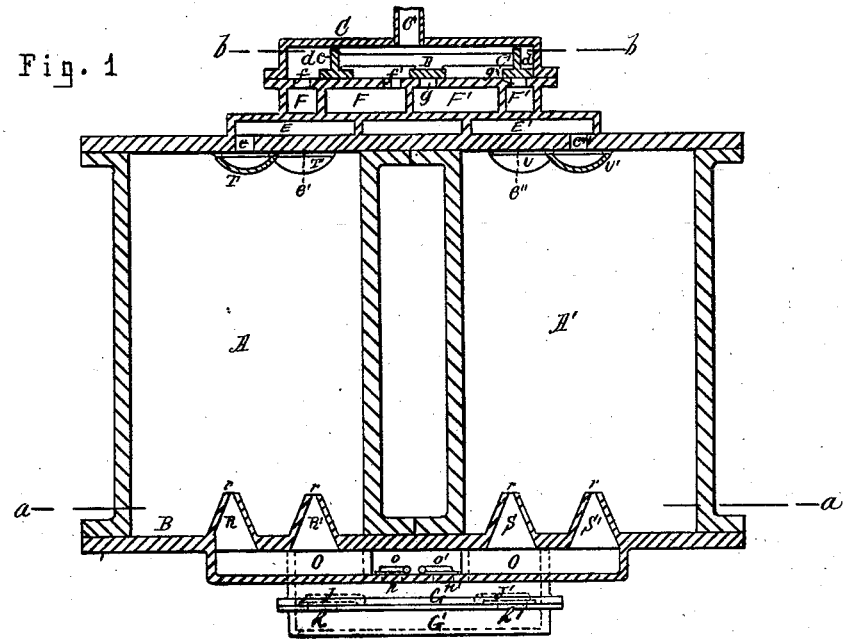
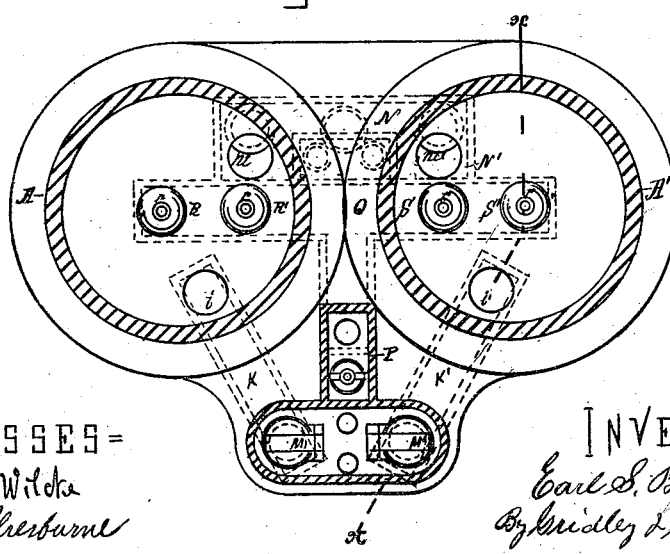
WITNESSES=
J. C. Wilcke
N. H. Sherburne
INVENTOR=
Earl S. Blake
By Gridley & Sherburne
Attorneys.

2 Sheets—Sheet 2.

E. S. BLAKE.
STEAM VACUUM-PUMP.

No. 191,397.  Patented May 29, 1877.

WITNESSES:
J. C. Wilcke
N. H. Sherburne

INVENTOR:
Earl S. Blake
By Gridley & Sherburne
Attorneys.

N. PETERS, PHOTO-LITHOGRAPHER, WASHINGTON, D. C.

UNITED STATES PATENT OFFICE.

EARL S. BLAKE, OF CHICAGO, ILLINOIS.

IMPROVEMENT IN STEAM VACUUM-PUMPS.

Specification forming part of Letters Patent No. 191,397, dated May 29, 1877; application filed May 12, 1877.

*To all whom it may concern:*

Be it known that I, EARL S. BLAKE, of Chicago, in the county of Cook and State of Illinois, have invented certain new and useful Improvements in Vacuum-Pumps; and I do hereby declare the following to be a full, clear, and exact description thereof, which will enable others skilled in the art to which my invention appertains to make and use the same, reference being had to the accompanying drawing, forming part of this specification, in which—

Figure 5:
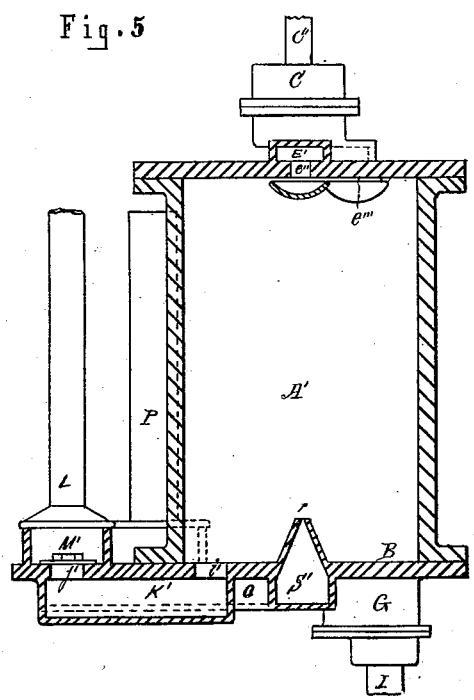
Figure 6:
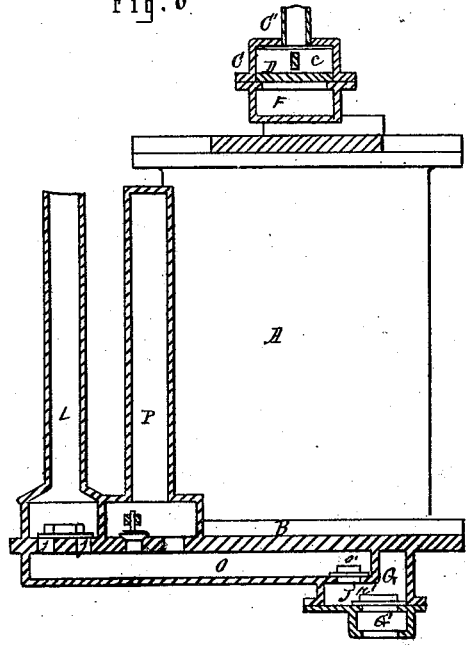
Figure 4:
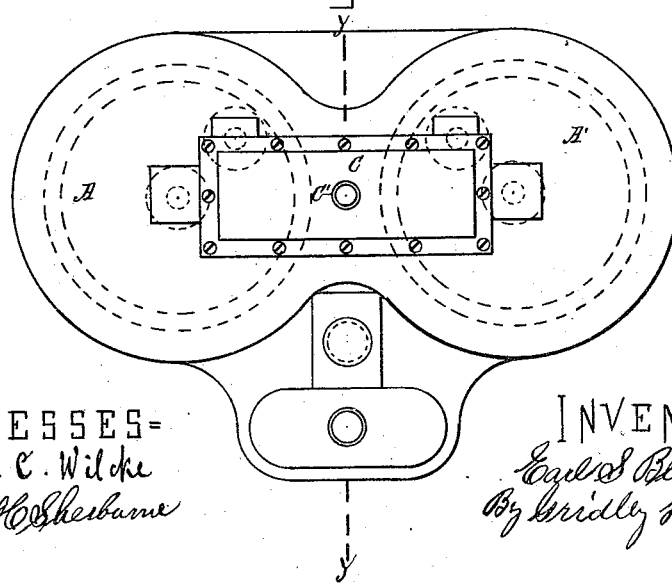

Figure 1 represents a vertical central section of a steam vacuum-pump embodying my said invention. Fig. 2 represents a sectional plan of the same, taken on the line $a\ a$, drawn across Fig. 1. Fig. 3 represents a sectional plan of the steam-chest, taken on the line $b\ b$, Fig. 1. Fig. 4 represents a general plan or top view of the same. Fig. 5 represents a sectional elevation of the same, taken on the line $x\ x$, drawn through Fig. 2; and Fig. 6 represents a central sectional elevation, taken on the line $y\ y$, drawn across Fig. 4.

Like letters of reference indicate like parts.

The object of my invention is to improve that class of steam vacuum-pumps now in use; and my invention consists in the arrangement of the several parts, as will be more fully understood by the following description and claims.

In the drawing, A and A' represent the pump-cylinders, which are arranged in a vertical position upon a suitable bed, B, and in close proximity to each other, as shown in Fig. 1. C represents the steam-chest, arranged centrally upon the cylinders A A', and communicating with the steam-boiler (not shown) through an induction-pipe, C'. D is the cut-off valve, arranged within the steam-chest, and so as to admit of a free and easy longitudinal reciprocating movement, and is provided on its upper surface with wings $c\ c'$, located near its ends, and extending transversely across the steam-chest, as shown in Figs. 3 and 6. The ends of the said wings fit against the side walls of the steam-chest, and the wings are located at the proper distance from the end of the valve to form chambers $d\ d'$ between their outer surface and the end walls of the steam-chest, and are each of the proper height to leave a slight space between its upper edge and the lower surface of the upper wall of the chest, through which the live steam leaks into the respective chambers $d$ and $d'$. E and E' are steam-ducts formed in the cylinder-heads, and communicate, respectively, with the interior of the cylinders through ports $e\ e'$ and $e''\ e'''$, as shown in Fig. 1. F and F' are steam-chambers, located between the ducts E E' and the steam-chests, and communicating with the said ducts through suitable openings (not shown) and with the steam-chest through ports $f f'$ and $g\ g'$, as shown in Fig. 1.

G and G' are the water chambers or cellars, which are located under the lower cylinder-heads. I is a suction-pipe, which communicates with the respective cellars through openings $h$, formed in the lower wall of the said cellars. J J' are check-valves, arranged over the respective openings $h$, to prevent the water receding from the cellars back into the suction-pipe. K K' are water-ducts, located under the respective cylinders A and A', and communicating at one end with said cylinders through openings $i\ i'$, and at the opposite end with the discharge-pipe L through ports $j\ j'$, formed through the upper wall of the ducts. M M' are check-valves, located over the ports $j\ j'$, to prevent the receding of the water from the discharge-pipe back into the ducts. N N' are water-ducts located under the lower cylinder-heads, the duct N communicating at one end with cellar G' and at the opposite end with cylinder A through an opening, $m$, formed through the cylinder-heads, and the duct N' communicates at one end with cellar G and at the opposite end with cylinder A' through an opening, $m'$, as shown in Fig. 2. O is a water-duct, formed in the lower surface of the lower cylinder-heads, and communicating with the respective cellars G and G' through openings $n\ n'$. $o\ o'$ are check-valves, arranged over the openings $n\ n'$, to prevent the water from receding from the duct O back into the cellars. P is an air-chamber communicating with the duct O, as shown in Fig. 6. R R' and S S' are jet-cones permanently attached to the upper surface of the lower cylinder-heads, and communicating with the duct O, and are each provided at the upper end with an opening, $r$, through which a jet of water is forced from the said duct O into the respective cylinders for condensing the steam therein. T T' and U U' are concaved deflecting-plates permanently attached to the lower surface of the upper cylinder-heads, centrally under the ports $e\ e'$ and $e''\ e'''$, as shown in Fig. 1.

The operation of my improved pump is as follows: The cylinders A A' are first formed by being partly filled with water, which flows into the respective water-ducts and cellars, filling the same and partly filling the air-chambers. The cut-off valve being in the position shown in Fig. 1, the steam is then admitted into the steam-chest, when it flows through ports $f$ and $f'$ into chambers F F, and from thence into duct E, and through ports $e$ $e'$ into cylinder A, forcing the water from said cylinder through opening $i$ into duct K, and from thence into the discharge-pipe L through opening $j$. When the water in said cylinder falls below the points of the jet-cones R R' the pressure of air in the air-chamber forces a jet of water through each cone into the cylinder A, so as to produce a spray sufficient to condense the steam in said cylinder and in duct E and chambers F and $d$, reducing the pressure of steam in said chamber $d$, so as to bring it below the pressure of live steam in chamber $d'$, when the cut-off valve is moved by the overbalanced pressure of steam in said chamber $d'$, and so as to close ports $f$ and $f'$ and open ports $g$ and $g'$ when the steam flows through said ports $g\ g'$ into chambers F F', and from thence into duct E' and through ports $e''\ e'''$ into cylinder A', forcing the water from said cylinder through opening $i'$ into duct K', and from thence into the discharge-pipe L through opening $j'$, and into the air-chamber P through duct O, filling said chamber. The water then flows through the suction pipe I into cellar G', and from thence into cylinder A through duct N and opening $m$, filling the vacuum in said cylinder, and when the water escaping from cylinder A' falls below the points of the cones S S' the pressure of air in chamber P forces a jet of water through the said cones sufficient to condense the steam in cylinder A', duct E', chambers F' and $d'$, when the overbalanced pressure of live steam in chamber $d$ again moves the cut-off valve, closing ports $g\ g'$ and opening ports $f f'$, when the steam again enters cylinder A, as before.

The object of the concaved deflecting-plates T T' and U U' is to cause the steam, as it enters the respective cylinders, to be thrown upward against the cylinder-heads, and so as to pass above the entire column of water in the cylinders.

Having thus described my invention, what I claim as new, and desire to secure by Letters Patent, is—

1. The combination, with the cylinders A A', ducts E E', chambers F F', and the steam-chest C, provided with the ports $f f'$ and $g\ g'$, of the cut-off valve D, arranged to alternately open and close said ports, and having the wings $c$ and $c'$ arranged to form the chambers $d$ and $d'$, substantially as and for the purpose specified.

2. The combination, with the cylinders A A' and cellars G G', as described, of the air-chamber P, ducts K K', N N', and O, arranged substantially in the manner and for the purpose set forth.

EARL S. BLAKE.

Witnesses:
THOMAS T. LOOMIS,
N. H. SHERBURNE.